United States Patent [19]
Stivani et al.

[11] Patent Number: 5,860,427
[45] Date of Patent: Jan. 19, 1999

[54] UNIT FOR FORMING GROUP OF CIGARETTES

[75] Inventors: Eros Stivani, Bologna; Fiorenzo Draghetti, Medicina, both of Italy

[73] Assignee: G.D Societa' per Azioni, Bologna, Italy

[21] Appl. No.: 916,765

[22] Filed: Aug. 19, 1997

[30] Foreign Application Priority Data

Aug. 20, 1996 [IT] Italy .................................. BO96A0440

[51] Int. Cl.$^6$ .................................................. A24C 1/38
[52] U.S. Cl. ........................... 131/281; 131/94; 131/282; 53/444; 198/450; 198/418.3
[58] Field of Search .............................. 198/470.1, 83.9, 198/450, 418.3; 131/281, 282, 94, 84.1; 53/149, 150, 148, 444, 540, 447

[56] References Cited

U.S. PATENT DOCUMENTS

| | | | |
|---|---|---|---|
| 4,645,063 | 2/1987 | Seragnoli | 198/450 |
| 5,070,991 | 12/1991 | Hinchcliffe et al. | 198/418.3 |
| 5,540,034 | 7/1996 | Focke | 53/444 |

FOREIGN PATENT DOCUMENTS

| | | |
|---|---|---|
| 362579 A | 4/1990 | European Pat. Off. . |
| 497689 A | 8/1992 | European Pat. Off. . |
| 2453455 A | 5/1976 | Germany . |

*Primary Examiner*—Aaron J. Lewis
*Assistant Examiner*—Charles W. Anderson
*Attorney, Agent, or Firm*—Marshall, O'Toole, Gerstein, Murray & Borun

[57] ABSTRACT

A unit for forming groups of cigarettes, wherein a transfer device transfers the cigarettes from a fixed withdrawal station, defined by an open bottom end of a hopper for cigarettes, on to a release surface traveling continuously along a given first path; the transfer device having an extracting device associated with the bottom end of the hopper to successively extract layers of cigarettes from the bottom end and feed the layers along a second path extending crosswise to the first path, and a rotary-platform device in turn having a number of suction type gripping heads movable between the first and second paths to feed the layers of cigarettes on to the release surface.

10 Claims, 3 Drawing Sheets

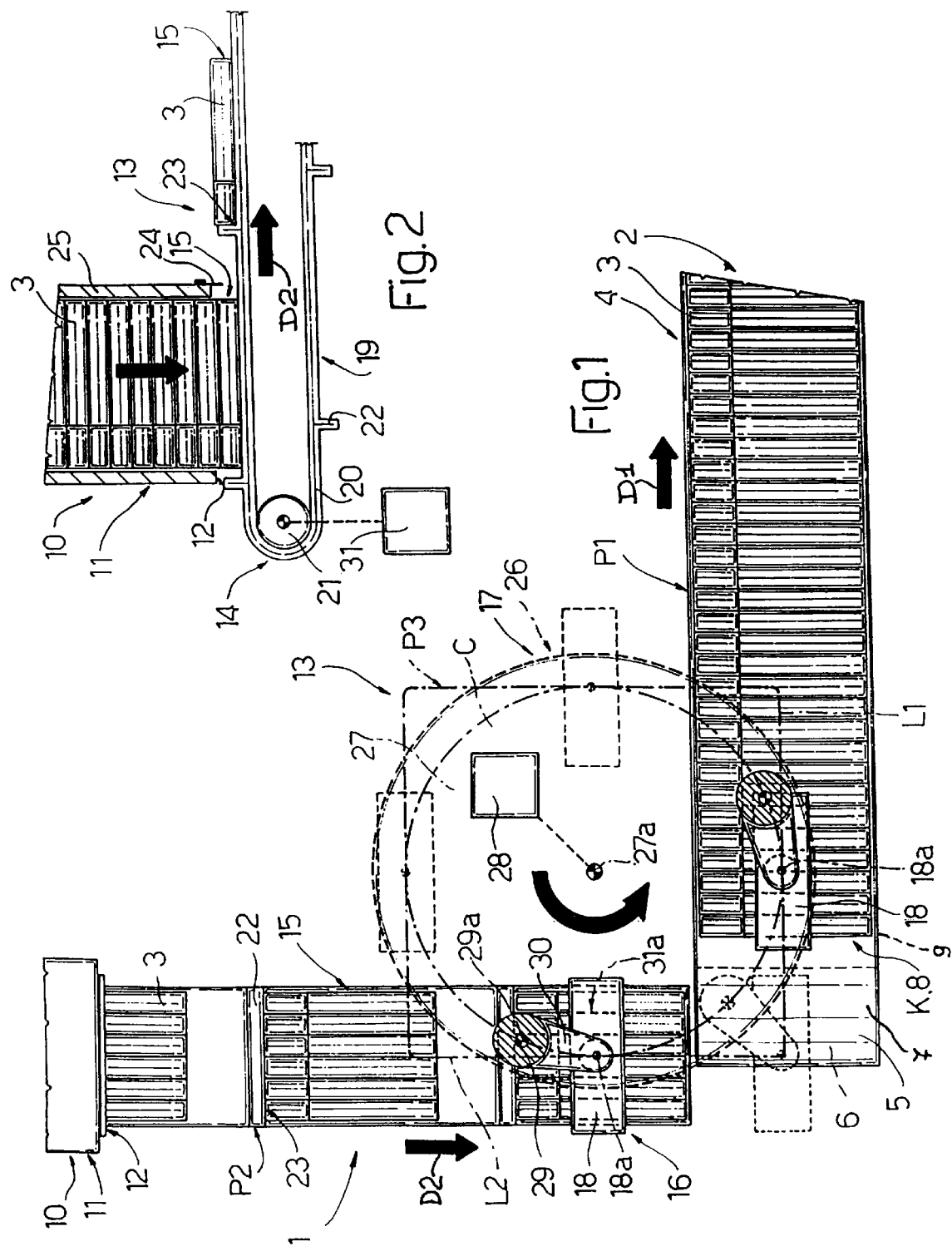

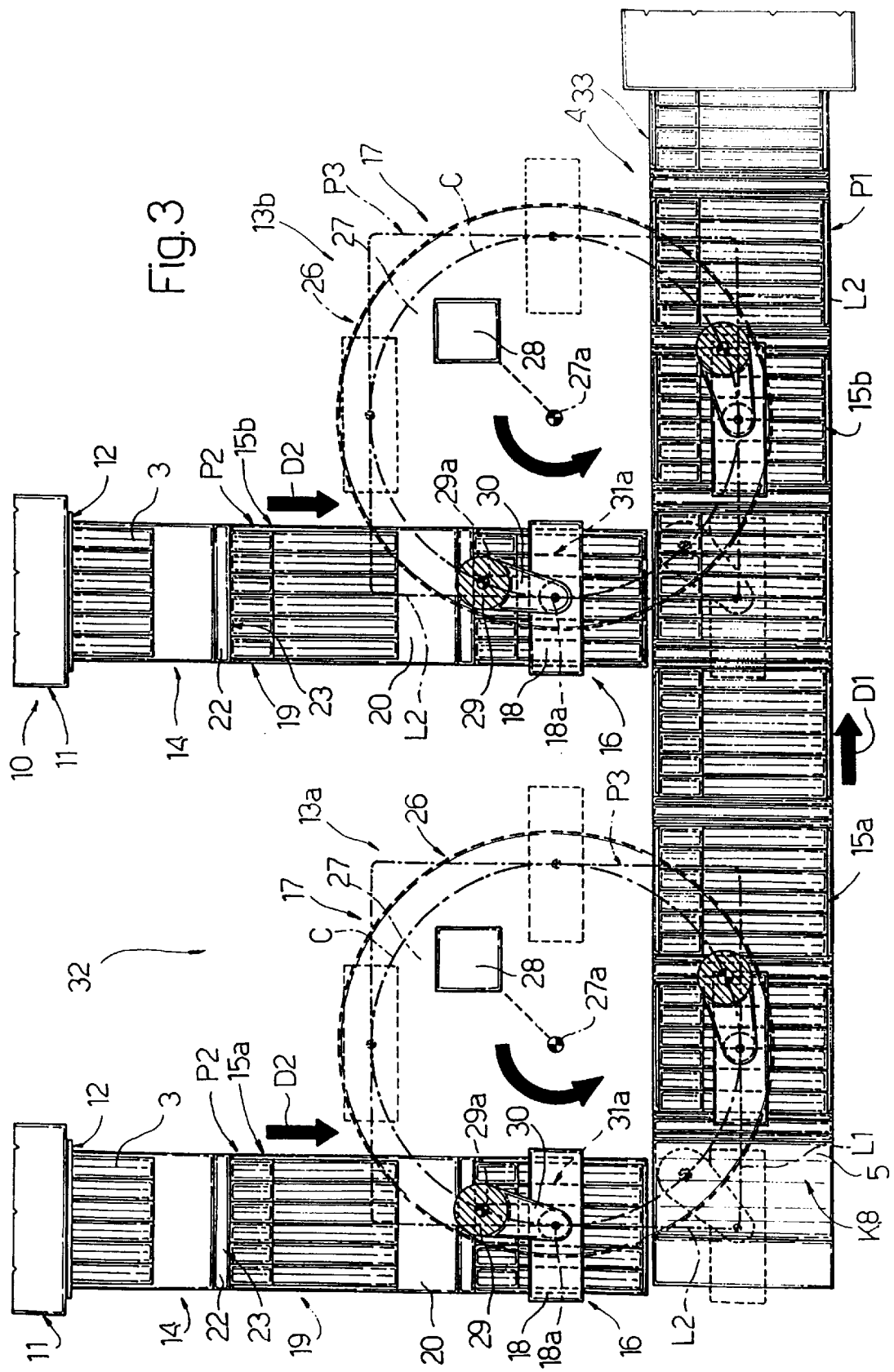

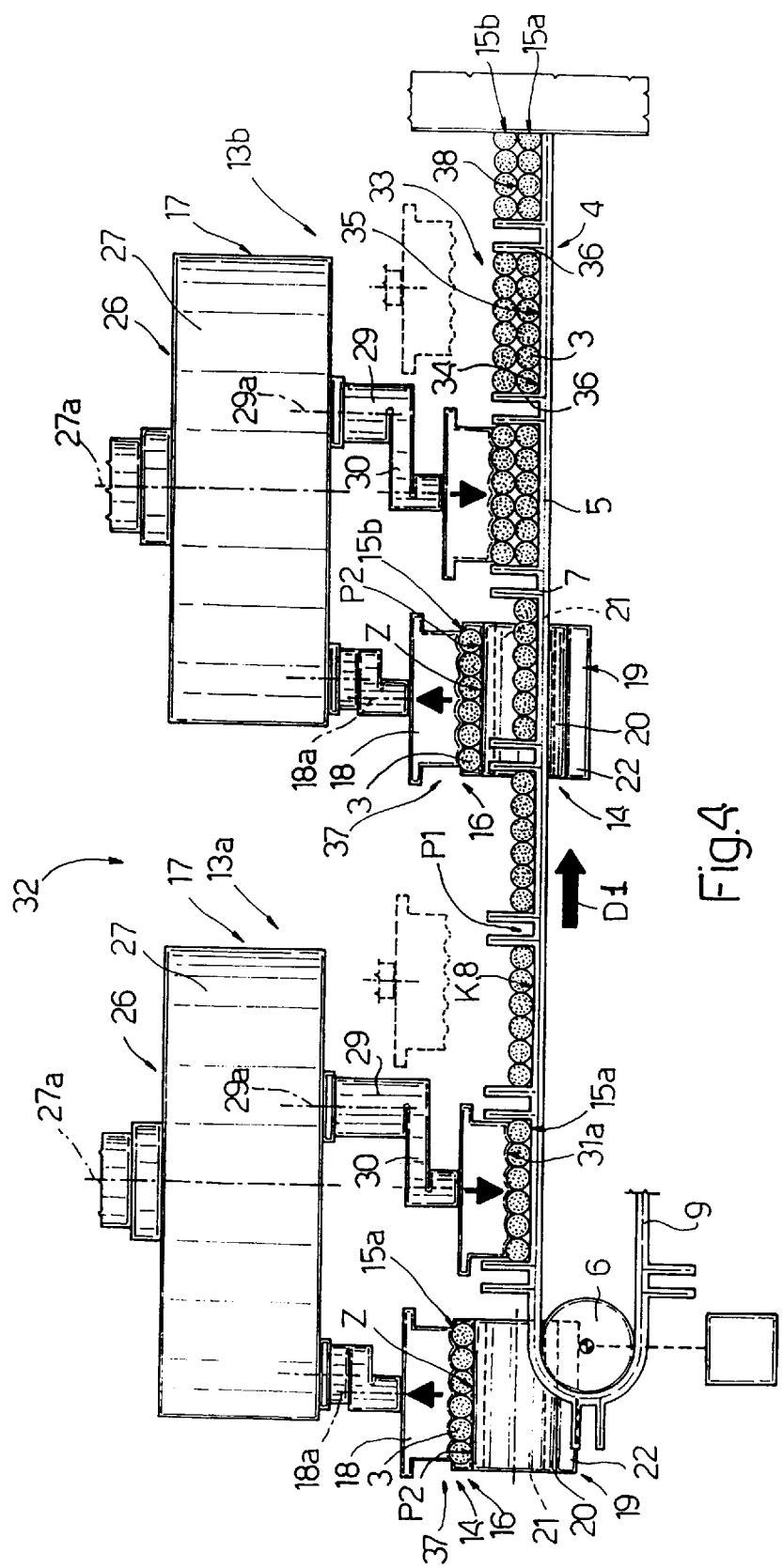

UNIT FOR FORMING GROUP OF CIGARETTES

BACKGROUND OF THE INVENTION

The present invention relates to a unit for forming groups of cigarettes.

In the tobacco industry, units for forming groups of cigarettes are known to comprise a cigarette hopper with at least one bottom outlet for the cigarettes; an output conveying device for feeding the groups of cigarettes along a given path; and a transfer device located between the bottom outlet of the hopper and the conveying device, and for withdrawing the cigarettes from the hopper and feeding them on to the conveying device.

Known transfer devices normally comprise a number of rotary drums, which are tangent to the bottom outlet of the hopper to withdraw the cigarettes successively from the outlet, are tangent to the conveying device to deposit the withdrawn cigarettes on to the device, and provide for feeding the cigarettes along a given supply path substantially tangent to both the bottom outlet of the hopper and the conveying device, and extending along part of the peripheral surfaces of the drums and through a succession of transfer stations where the drums are substantially tangent to one another to feed the cigarettes from one drum to another.

Known transfer devices of the above type involve several drawbacks, due, firstly, to the highly complex design and, hence, high production and maintenance cost of the device, and, secondly, to the amount of manipulation the cigarettes are subjected to along the supply path.

SUMMARY OF THE INVENTION

It is an object of the present invention to provide a unit for forming groups of cigarettes, which is straightforward and cheap to produce, is highly reliable, and provides for greatly reducing the amount of manipulation to which the cigarettes are subjected.

According to the present invention, there is provided a unit for forming groups of cigarettes, the unit comprising a hopper for cigarettes, in turn comprising at least one outlet, the outlet having an open bottom end defining a fixed withdrawal station for the cigarettes; conveying means comprising a release surface for said cigarettes, and traveling continuously along a given first path to feed forward the release surface; and transfer means associated with said outlet to transfer the cigarettes from said fixed withdrawal station on to said release surface; the unit being characterized in that said transfer means comprise extracting means for successively extracting layers of cigarettes from said open bottom end and feeding the layers along a given second path; and gripping means for withdrawing the layers of cigarettes from the second path and feeding the layers on to said release surface.

BRIEF DESCRIPTION OF THE DRAWINGS

A number of non-limiting embodiments of the present invention will be described by way of example with reference to the accompanying drawings, in which:

FIG. 1 shows a plan view, with parts in section and parts removed for clarity, of a first preferred embodiment of the transfer unit according to the present invention;

FIG. 2 shows a side view, with parts in section and parts removed for clarity, of a detail of the FIG. 1 unit;

FIG. 3 shows a plan view, with parts in section and parts removed for clarity, of a second preferred embodiment of the transfer unit according to the present invention;

FIG. 4 shows a front view of the FIG. 3 unit.

DETAILED DESCRIPTION OF THE INVENTION

With reference to FIGS. 1 and 2, number 1 indicates a unit for forming groups 2 of cigarettes 3. More specifically, in the FIG. 1 and 2 embodiment, unit 1 provides for forming a group 2 defined by a number of cigarettes 3 arranged successively side by side on a surface K for conveying cigarettes 3.

Unit 1 comprises an output conveying device 4 for continuously feeding group 2 along a given path P1 and in a given direction D1 crosswise to cigarettes 3 in group 2, and which in turn comprises a conveyor belt 5 looped about two pulleys 6 (only one shown) defining, on belt 5, an upper conveying branch 7 defined at the top by a flat surface 8 defining conveying surface K of group 2, and a lower return branch 9. Unit 1 also comprises a hopper (indicated as a whole by 10) for cigarettes 3, which is substantially located over surface 8, is offset vertically with respect to belt 5, and in turn comprises at least one outlet 11 having an open bottom end 12 through which cigarettes 3 fall by gravity out of outlet 11.

Finally, unit 1 comprises a transfer device 13 associated with outlet 11, and for transferring cigarettes 3 from a fixed withdrawal station defined by bottom end 12 of outlet 11, on to a release surface defined by flat surface 8 of belt 5.

Device 13 comprises an extracting device 14 located beneath outlet 11, and for successively extracting layers 15 of cigarettes 3 from bottom end 12 of outlet 11, and feeding layers 15 along a given path P2 to an unloading station 16; and a so-called "rotary-platform" carousel device 17, in turn comprising a number of gripping heads 18, which are fed substantially continuously through station 16 to pick up respective layers 15, and over surface K to deposit respective layers 15 on to surface 8.

More specifically, extracting device 14 comprises a pocket conveyor 19, in turn comprising a belt 20 looped about two pulleys 21 (only one shown) and traveling along path P2 in a given traveling direction D2 parallel to cigarettes 3 in layers 15. Conveyor 19 also comprises a succession of transverse projections 22, which travel across bottom end 12 to withdraw respective layers 15 of cigarettes 3, and define, on belt 20, respective pockets 23, each for conveying respective layer 15 along path P2, and each of a length, measured in direction D2, greater than the length of cigarettes 3.

As, in use, cigarettes 3 in layer 15 at bottom end 12 rest directly on belt 20 and may even be extracted by belt 20 from outlet 11 as a result of friction between cigarettes 3 and belt 20, extracting device 14 also comprises a flexible stop 24 fitted to a front vertical wall 25 of outlet 11, and projecting downwards beyond bottom end 12 to engage cigarettes 3 in layer 15 partially withdrawn from bottom end 12, and position cigarettes firmly against respective projection 22.

Device 17 comprises a carousel conveyor 26, in turn comprising a rotary head 27 rotated anticlockwise (in FIG. 1) about a substantially vertical axis 27a by known drive means 28 (shown schematically). Head 27 is fitted underneath with a number of output shafts 29 equally spaced about axis 27a and rotating about axis 27a together with head 27; and each shaft 29 is fitted at the bottom end with a respective crank 30 fitted on the free end with a respective suction type gripping head 18, and is rotated about a respective axis 29*a*, parallel to axis 27*a*, and at an angular speed equal to the angular speed of head 27, by a known epicyclic transmission (not shown).

More specifically, and as shown schematically in FIG. 1, shafts 29 rotate about respective axes 29*a* in the opposite direction to head 27, so that, by virtue of the combined rotation of head 27 and of shafts 29 about respective axes 29*a*, respective suction heads 18 are maintained parallel to themselves and to direction D1 at all times. As head 27 rotates, shafts 29 (and, more specifically, respective axes 29*a*) are fed along a substantially circular path C, whereas respective suction heads 18 (and, more specifically, respective axes 18*a* parallel to respective axes 29*a*) are fed along a substantially quadrangular path P3 comprising a side L1 parallel to path P1 and direction D1, and a side L2 crosswise to side L1 and parallel to path P2 and direction D2. Side L2 extends through unloading station 16, whereas side L1 extends along surface 8 to enable each suction head 18, in use, to withdraw a respective layer 15 at station 16, and deposit it on to surface 8 after traveling, along path P3, about a substantially 90° arc in the rotation direction of head 27.

In actual use, layers 15 of cigarettes 3 are extracted successively from outlet 11 through bottom end 12 by extracting device 14, the projections 22 of which engage the ends of cigarettes 3 and withdraw cigarettes 3 from outlet 11. Since belt 20, however, not only provides for feeding projections 22 across bottom end 12 by means of a motor 31 connected to one of pulleys 21, but also acts as a support for the cigarettes 3 inside outlet 11, and since layers 15 may be partially withdrawn from outlet 11 by the friction between layer 15 at bottom end 12 and belt 20 being greater than the friction between layer 15 and the cigarettes 3 still inside outlet 11, stop 24 engages the cigarettes 3 in the layer 15 being withdrawn, so as to slide cigarettes inwards of respective pocket 23 and against respective projection 22, to enable cigarettes 3 to be withdrawn from outlet 11, and also ensure layer 15 is correctly timed with respect to respective head 18 at unloading station 16.

Upon cigarettes 3 in layer 15 reaching station 16 in time with a respective head 18, they are picked up by head 18 and retained by suction on head 18 and inside respective substantially cylindrical grooves 31*a* formed underneath head 18; and, as head 27 feeds head 18 along side L1, i.e. along path P1 and over surface 8, the suction through head 18 is cut off, and layer 15 is deposited on to conveying surface K.

The above operations are repeated in exactly the same way for all of layers 15, so that respective heads 18 deposit layers 15 side by side on to surface 8 to form a group 2 of cigarettes 3.

The FIG. 3 and 4 embodiment relates to a unit 32 for forming groups 33, and which is similar to unit 1, except that hopper 10 comprises two outlets 11 in series along path P1; unit 32 comprises a transfer device 13 for each outlet 11; and unit 32 provides for forming groups 33 of cigarettes 3, each comprising at least two superimposed layers 15.

Moreover, output conveying device 4 comprises a succession of substantially U-shaped pockets 34 defined by a bottom surface 35 coplanar with surface K, and by two vertical lateral walls 36 crosswise to direction D1 and connected rigidly to belt 5. Each pocket 34 is designed to house a respective group 33, and is fed through two loading station 37 located in series along path P1, and at each of which each pocket 34 receives a respective layer 15.

Finally, shafts 29 are connected in known manner to known actuating means (not shown) housed inside head 18, and for moving shaft 29 axially and imparting to head 18 a movement crosswise to surface K to enable head 18, in use, to be inserted between walls 36 of a respective pocket 34, and to deposit a respective layer 15 of cigarettes 3 inside pocket 34. More specifically, each belt 20 conveys layers 15 on a respective conveying surface Z raised with respect to surface K by a distance greater than the total thickness of at least two cigarettes 3; and each shaft 29 moves respective head 18 between a raised loading position, in which head 18 is separated from surface Z by a distance substantially equal to the thickness of one cigarette 3, and a lowered unloading position, in which head 18 is separated from surface K by a given distance, which, in the case of the first transfer device 13*a* along path P1, is substantially equal to the thickness of one cigarette 3, and, in the case of the second transfer device 13*b*, is substantially equal to the total thickness of two cigarettes 3.

Operation of unit 32 may be deduced, with no further explanation, from what has already been said in connection with unit 1. It should be pointed out, however, that, in the case of unit 32, the release surface, defined by surface 8 in unit 1, is defined by the bottom surface 35 of each pocket 34 when pocket 34 is supplied by device 13*a* with a first layer 15*a* of cigarettes 3, and by the top surface 38 of layer 15*a* when pocket 34 is supplied by device 13*b* with a second layer 15*b*.

We claim:

1. A unit (1; 32) for forming groups (2; 33) of cigarettes (3), the unit comprising a hopper (10) for cigarettes (3), in turn comprising at least one outlet (11), the outlet (11) having an open bottom end (12) defining a fixed withdrawal station (12) for the cigarettes (3); conveying means (4) comprising a release surface (8; 35,38) for said cigarettes (3), and traveling continuously along a given first path (P1) to feed forward the release surface (8; 35,38); and transfer means (13) associated with said outlet (11) to transfer the cigarettes (3) from said fixed withdrawal station (12) on to said release surface (8; 35,38); the unit (1; 32) being characterized in that said transfer means (13) comprise extracting means (14) for successively extracting layers (15) of cigarettes (3) from said open bottom end (12) and feeding the layers (15) along a given second path (P2); and gripping means (18) for withdrawing the layers (15) of cigarettes (3) from the second path (P2) and feeding the layers (15) on to said release surface (8; 35,38).

2. A unit as claimed in claim 1, characterized in that said transfer means (13) comprise a carousel conveying device (26) associated with said gripping means (18), and for moving the gripping means (18) along a third path (P3) comprising a first side (L1) parallel to the first path (P1), and a second side (L2) parallel to the second path (P2).

3. A unit as claimed in claim 2, characterized in that said first and second sides (L1, L2) are crosswise to each other.

4. A unit as claimed in claim 3, characterized in that said carousel conveying device (26) is a rotary-platform device.

5. A unit as claimed in claim 4, characterized in that said extracting means (14) comprise a conveyor (19) having pockets (23) and traveling beneath said open bottom end (12); each pocket (23) feeding a respective layer (15) of cigarettes (3) along the second path (P2), to feed the layer (15) of cigarettes (3) to an unloading station (16) in time with said gripping means (18).

6. A unit as claimed in claim 5, characterized in that said release surface (8) is defined by a continuous conveying surface (K) extending along said first path (P1); said gripping means (18) feeding said layers (15) of cigarettes (3) along said conveying surface (K), and depositing the layers

(15) side by side to form a group (2) of cigarettes (3) comprising a number of side by side cigarettes (3).

7. A unit as claimed in claim 5, characterized in that said conveying means (4) are pocket conveying means comprising conveying pockets (34), each for feeding at least one said layer (15) of cigarettes (3) along said first path (P1); each said layer (15) of cigarettes (3) inside the respective conveying pocket (34) forming a respective group (33) of cigarettes (3).

8. A unit as claimed in claim 7, characterized in that said hopper (10) comprises at least two outlets (11) located in series along said first path (P1); each outlet (11) having a respective open bottom end (12) defining a respective fixed withdrawal station (12) for the cigarettes (3); and said transfer means (13) being associated with each said outlet (11) to transfer the cigarettes (3) from the respective fixed withdrawal station (12) on to said release surface (35, 38).

9. A unit as claimed in claim 8, characterized in that said conveying pockets (34) feed along said first path (P1) at least a first and second layer (15*a*, 15*b*) of cigarettes (3) arranged one on top of the other; said first and second layers (15*a*, 15*b*) of cigarettes (3) inside the respective conveying pocket (34) forming a respective group (33) of cigarettes (3).

10. A unit as claimed in claim 9, characterized in that said third path (P3) is a three-dimensional path; said gripping means (18) comprising a movement crosswise to said release surface (35, 38) at least along said second side (L2).

* * * * *